(12) United States Patent
Cha et al.

(10) Patent No.: US 9,309,963 B2
(45) Date of Patent: Apr. 12, 2016

(54) TRANSMISSION DEVICE FOR VEHICLE

(71) Applicant: SL Corporation, Daegu (KR)

(72) Inventors: Hong Jun Cha, Gyeongsangbuk-Do (KR); Jun Hyung Seo, Gyeongsangbuk-Do (KR)

(73) Assignee: SL Corporation, Daegu (KR)

(*) Notice: Subject to any disclaimer, the term of this patent is extended or adjusted under 35 U.S.C. 154(b) by 42 days.

(21) Appl. No.: 14/550,512

(22) Filed: Nov. 21, 2014

(65) Prior Publication Data

US 2015/0143939 A1 May 28, 2015

(30) Foreign Application Priority Data

Nov. 22, 2013 (KR) .................. 10-2013-0143041

(51) Int. Cl.
*F16H 61/26* (2006.01)
*F16H 59/12* (2006.01)

(52) U.S. Cl.
CPC ........... *F16H 59/12* (2013.01); *Y10T 74/20177* (2015.01)

(58) Field of Classification Search
None
See application file for complete search history.

(56) References Cited

U.S. PATENT DOCUMENTS

| 4,281,526 A * | 8/1981 | Lipschutz | ............. B60R 25/066 180/333 |
| 6,427,553 B1 * | 8/2002 | Hogberg | ............. F16H 59/0204 200/5 R |
| 8,955,405 B2 * | 2/2015 | Heo | ........................ F16H 59/04 74/473.18 |

* cited by examiner

*Primary Examiner* — Dirk Wright
(74) *Attorney, Agent, or Firm* — Mintz Levin Cohn Ferris Glovsky and Popeo, P.C.; Kongsik Kim

(57) ABSTRACT

A transmission device for a vehicle is provided. The transmission device includes a first rotating unit configured to be rotatably coupled to a first rotating axis and a second rotating unit configured to be rotatably coupled to a second rotating axis separated from the first rotating axis. A joint unit is configured to connect the first rotating unit and the second rotating unit to allow the first rotating unit and the second rotating unit to rotate relative to each other. A shift mode selection unit is mounted on at least one of the first rotating unit, the second rotating unit, and the joint unit. Additionally, a driving unit is configured to rotate the second rotating unit about the second rotating axis in response to receiving an operating signal to change an angle between the first rotating unit and the second rotating unit with respect to the joint unit.

10 Claims, 7 Drawing Sheets

TRANSMISSION DEVICE FOR VEHICLE

This application claims priority to Korean Patent Application No. 10-2013-0143041 filed on Nov. 22, 2013 in the Korean Intellectual Property Office, the disclosure of which is incorporated herein by reference in its entirety.

TECHNICAL FIELD

The invention relates to a transmission device for a vehicle, and more particularly, to a transmission device for a vehicle equipped with a driver welcome function.

RELATED ART

In a vehicle equipped with an automatic transmission, that is, a transmission capable of automatically changing gear ratios according to the moving speed of the vehicle, a shift lever may be provided to manipulate the operating mode of the automotive transmission according to the driving circumstances around the vehicle. In recent years, various types of transmission devices, other than a typical lever-type transmission device, such as a dial-type transmission device or a button-type transmission device have been developed and used.

SUMMARY

The present invention provides a new type of transmission device that may be applied to an automatic transmission vehicle. However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, a transmission device for a vehicle disposed within the vehicle may be configured to operate a transmission for transmitting the output of the engine of the vehicle to driving wheels. The transmission device may include: a first rotating unit configured to be rotatably coupled to a first rotating axis; a second rotating unit configured to be rotatably coupled to a second rotating axis, separated from the first rotating axis; a joint unit configured to connect the first rotating unit and the second rotating unit for the first rotating unit and the second rotating unit to rotate relative to each other; a shift mode selection unit configured to be mounted on at least one of the first rotating unit, the second rotating unit and the joint unit; and a driving unit configured to rotate the second rotating unit about the second rotating axis in response to receiving an operating signal to adjust an angle between the first rotating unit and the second rotating unit with respect to the joint unit.

According to exemplary embodiments of the invention, it may be possible to provide a driver welcome function capable of changing the shape of a transmission device for a vehicle depending on whether a driver is seated in the driver's seat of a vehicle or how the driver is driving the vehicle. Accordingly, it may be possible to notify the driver whether the vehicle is being in a normal operating state and improve the emotional satisfaction of the driver. Since a transmission device may be ejected from, or retracted into, the console of a vehicle, it may be possible to secure the versatility of the design within a vehicle.

Other features and exemplary embodiments will be apparent from the following detailed description, the drawings, and the claims.

BRIEF DESCRIPTION OF THE DRAWINGS

The above and other objects, features and advantages of the present invention will be more clearly understood from the following detailed description taken in conjunction with the accompanying drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Advantages and features of the invention and methods of accomplishing the same may be understood more readily by reference to the following detailed description of exemplary embodiments and the accompanying drawings. The invention may, however, be embodied in many different provides and should not be construed as being limited to the exemplary embodiments set forth herein. Rather, these exemplary embodiments are provided so that this disclosure will be thorough and complete and will fully convey the concept of the invention to those skilled in the art, and the invention will only be defined by the appended claims. Like reference numerals refer to like elements throughout the specification.

Figure 1:
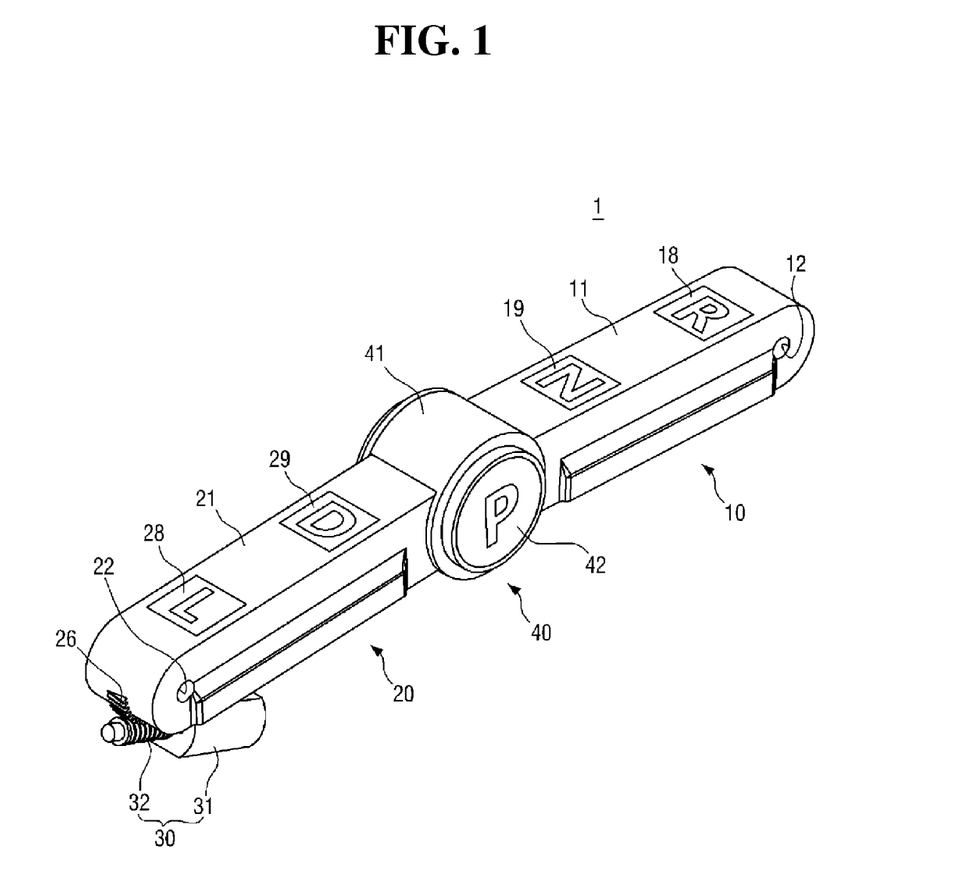
FIG. 1 is an exemplary diagram illustrating a transmission device for a vehicle, according to a first exemplary embodiment of the present invention.

Exemplary embodiments will hereinafter be described with reference to the accompanying drawings. FIG. 1 is an exemplary diagram illustrating a transmission device for a vehicle, according to a first exemplary embodiment of the invention. Referring to FIG. 1, a transmission device 1 for a vehicle may include a first rotating unit 10, a second rotating unit 20, a joint unit 40, a driving unit 30 and a shift mode selection unit (18, 19, 28, 29 and 42).

The first rotating unit 10 and the second rotating unit 20 may be disposed on either side of the joint unit 40, and may be connected to each other to rotate relative to each other. The shift mode selection unit (18, 19, 28, 29 and 42) may include a reverse "R" stage selector 18, a neutral "N" stage selector, an "L" stage selector 28, a drive "D" stage selector 29, and a park "P" stage selector 42. The "R" stage selector 18 and the "N" stage selector 19 may be disposed on one surface of the first rotating unit 10, the "D" stage selector 29 and the "L" stage selector 28 may be disposed on one surface of the second rotating unit 20, and the "P" stage selector 42 may be disposed on one side of the joint unit 40.

The arrangement of the "R" stage selector 18, the "N" stage selector 19, the "L" stage selector 28, the "D" stage selector 29, and the "P" stage selector 42 may vary. For example, the "P" stage selector 42 may be disposed on one surface of the first rotating unit 10 or the second rotating unit 20, instead of on the side of the joint unit 40, and one of the "R" stage selector 18, the "N" stage selector 19, the "L" stage selector 28 and the "D" stage selector 29 may be disposed on the side of the joint unit 40. The "R" stage selector 18, the "N" stage selector 19, the "L" stage selector 28, the "D" stage selector 29, and the "P" stage selector 42 may be implemented as buttons.

As illustrated in FIG. 1, the joint unit 40 may include a case 41, which surrounds the connection between the first rotating unit 10 and the second rotating unit 20. The first rotating unit 10, the second rotating unit 20, the joint unit 40 and the driving unit 30 of the transmission device 1 will hereinafter be described in further detail.

Figure 2:
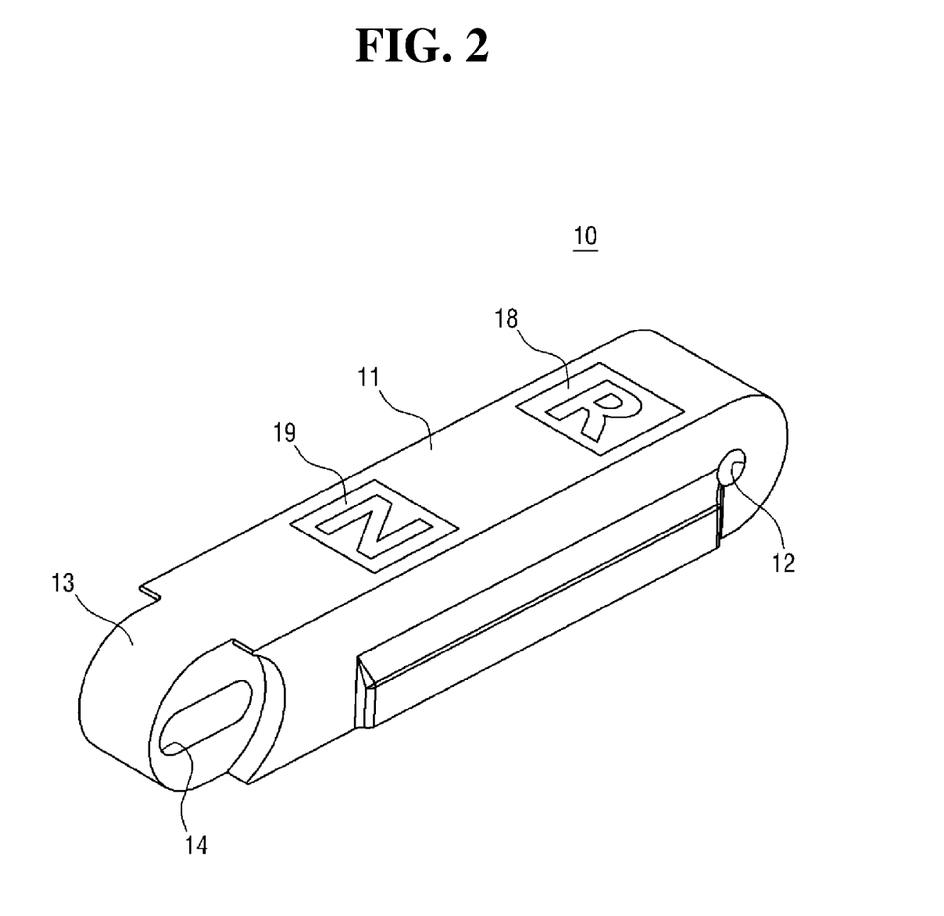
FIG. 2 is an exemplary diagram illustrating a first rotating unit of the transmission device of FIG. 1 according to an exemplary embodiment of the present invention.

FIG. 2 is an exemplary diagram illustrating a first rotating unit of the transmission device of FIG. 1. Referring to FIG. 2, the first rotating unit 10 may include a body 11, which may be bar-shaped. The "R" stage selector 18 and the "N" stage selector 19 of the shift mode selection unit (18, 19, 28, 29 and 42) may be disposed on one surface of the body 11. A first aperture 12 into which a first rotating axis (not illustrated) is coupled may be formed at a first end of the body 11. The first rotating axis may be formed in a console (not illustrated) within a vehicle (not illustrated) where the transmission device 1 may be mounted. A first end of the first rotating unit 10 may be rotatably fixed to the console.

In response to the transmission device 1 being in a standby state, the first rotating unit 10 may be configured to remain inserted in the console, in which case, the first rotating axis may be formed within the console. The body 11 may be formed to be curved at the first end thereof to rotate about the first rotating axis. A first arm 13, formed to extend from the body 11, may be disposed at a second end of the body 11. The first arm 13 may be disposed within the case 41 of the joint unit 40, and may be coupled to the first rotating unit 10 and the second rotating unit 20 to allow the first rotating unit 10 and the second rotating unit 20 to rotate relative to each other. The first arm 13 may be formed to be curved at a second end thereof to rotate relative to the second rotating unit 20. A slit 14 may be formed at substantial the center of the first arm 13 to extend to a predetermined length toward the body 11.

Figure 3:
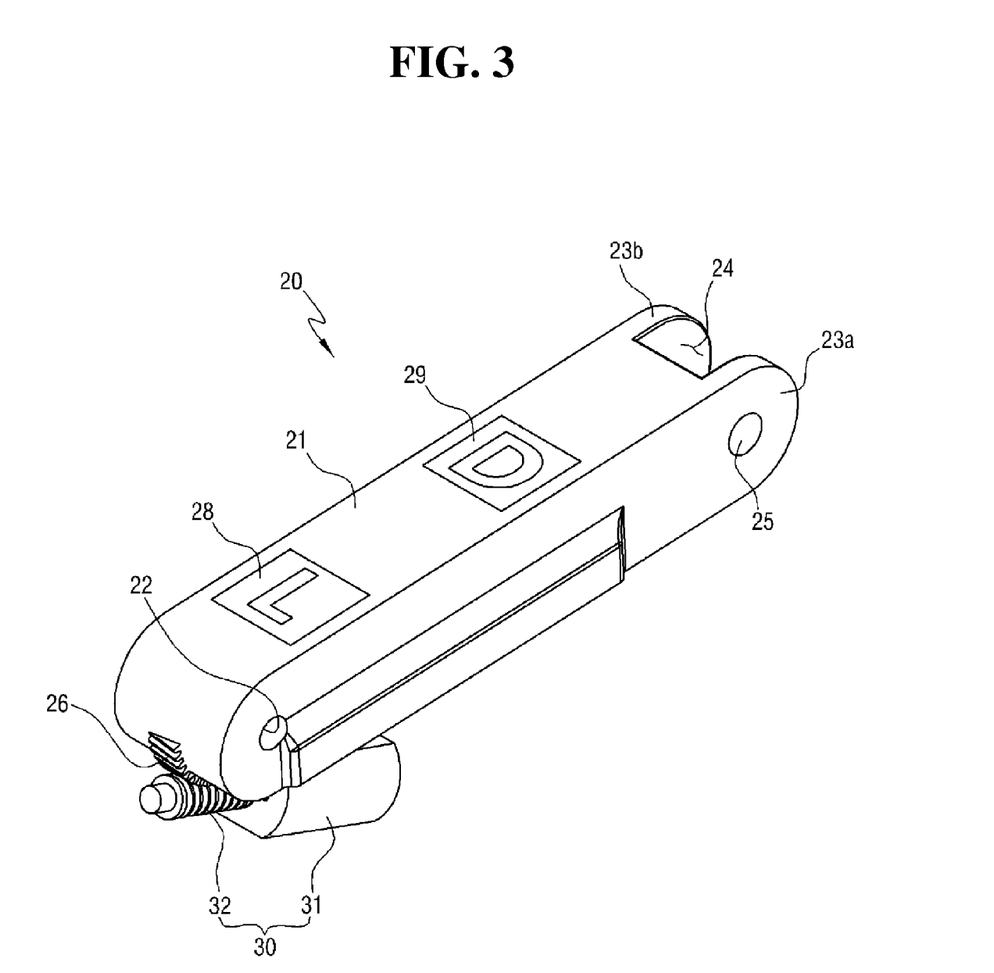
FIG. 3 is an exemplary diagram illustrating a second rotating unit of the transmission device of FIG. 1 according to an exemplary embodiment of the present invention.

FIG. 3 is an exemplary diagram illustrating a second rotating unit of the transmission device of FIG. 1. Referring to FIG. 3, the second rotating unit 20 may include a body 21, which may be bar-shaped and may be substantially symmetrical to the body 11 of the first rotating unit 10. The "D" stage selector 29 and the "L" stage selector 28 of the shift mode selection unit (18, 19, 28, 29 and 42) may be disposed on one surface of the body 21. A pair of second arms 23a and 23b formed to extend from the body 21, may be disposed on either side of the body 21. The second arms 23a and 23b may be disposed within the case 41 of the joint unit 40, and may be coupled to the first arm 13.

For the coupling of the second arms 23a and 23b to the first arm 13, a first arm mounting space 24 may be disposed between the second arms 23a and 23b. A pin 25, which connects the second arms 23a and 23b, may be disposed across the first arm mounting space 24. The pin 25 may be configured to penetrate the slit 14 of the first arm 13 and may slidably move along the slit 14. For the second rotating unit 20 to rotate relative to the first rotating unit 10, each of the second arms 23a and 23b may be formed to be curved at a first end thereof. Since the pin 25 connects the first rotating unit 10 and the second rotating unit 20 by penetrating the slit 14, the first rotating unit 10 and the second rotating unit 20 may be coupled together to relative rotation to each other. In addition, since the pin 25 may slidably move along the slit 14, the overlapping length of the first rotating unit 10 and the second rotating unit 20 may vary by as much as the length of the slit 14. In other words, the length from the first end of the first rotating unit 10 to a second end of the second rotating unit 20 may vary.

A second aperture 22 into which a second rotating axis (not illustrated) is coupled may be formed at the second end of the second rotating unit 20. The second rotating axis may be a predetermined distance from the first rotating axis, and may be formed in the console within the vehicle where the transmission device 1 may be mounted. The second end of the second rotating unit 20 may be rotatably fixed to the console. In response to the transmission device 1 being in the standby state, the second rotating unit 20 may be configured to remain inserted in the console, in which case, the second rotating axis may be formed within the console. The body 21 may be formed to be curved at a second end thereof to rotate about the second rotating axis.

Figure 4:
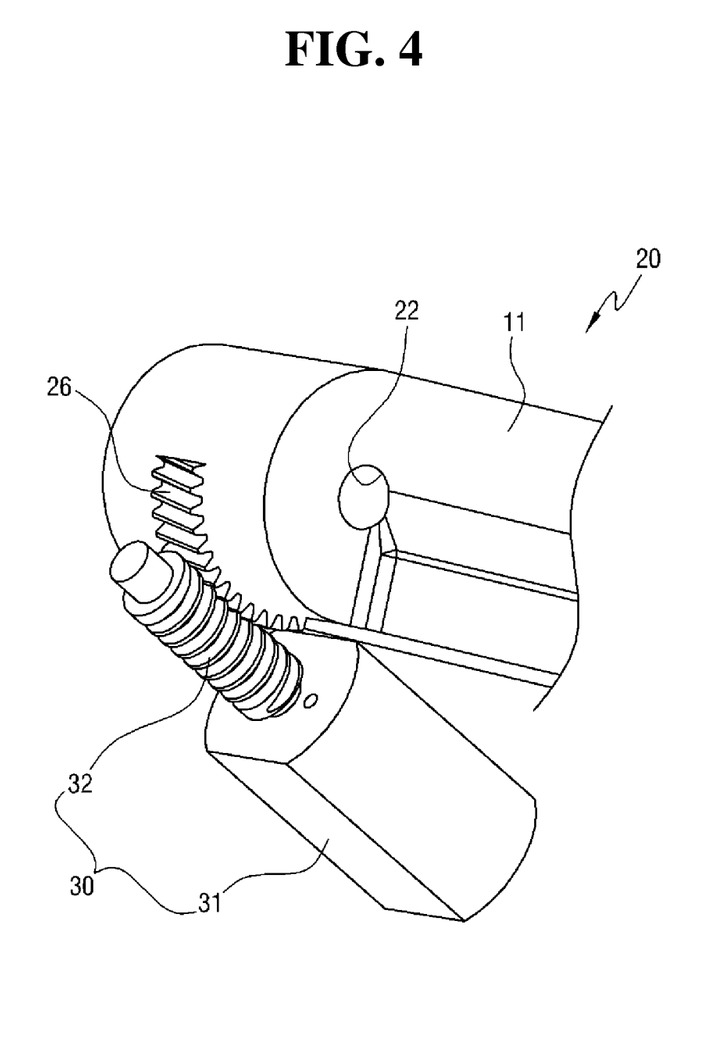
FIG. 4 is an exemplary diagram illustrating a driving unit of the transmission device of FIG. 1 according to an exemplary embodiment of the present invention.

FIG. 4 is an exemplary diagram illustrating a driving unit of the transmission device of FIG. 1. Referring to FIG. 4, the driving unit 30 may include a driving source 31 and a worm gear 32 disposed at the driving axis of the driving source 31. A worm 26 corresponding to the worm gear 32 may be disposed below the second end of the body 21. In response to the driving source 31 rotating the worm gear 32 in a first or second direction, the worm 26 may be moved forward or rearward. Since the second end of the second rotating unit 20 may be rotatably fixed to the second rotating axis, the second rotating unit 20 may rotate clockwise or counterclockwise in response to the driving source 31 rotating the worm gear 32 in the first or second direction.

Figure 5:
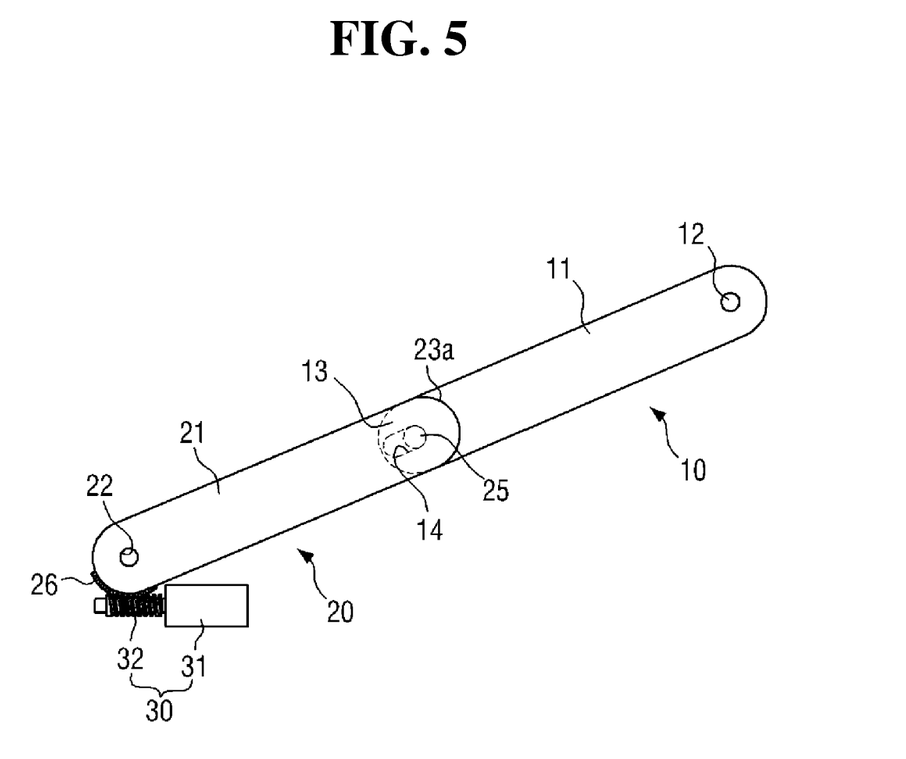
FIG. 5 is an exemplary diagram illustrating the transmission device of FIG. 1 in its standby state according to an exemplary embodiment of the present invention.
Figure 6:
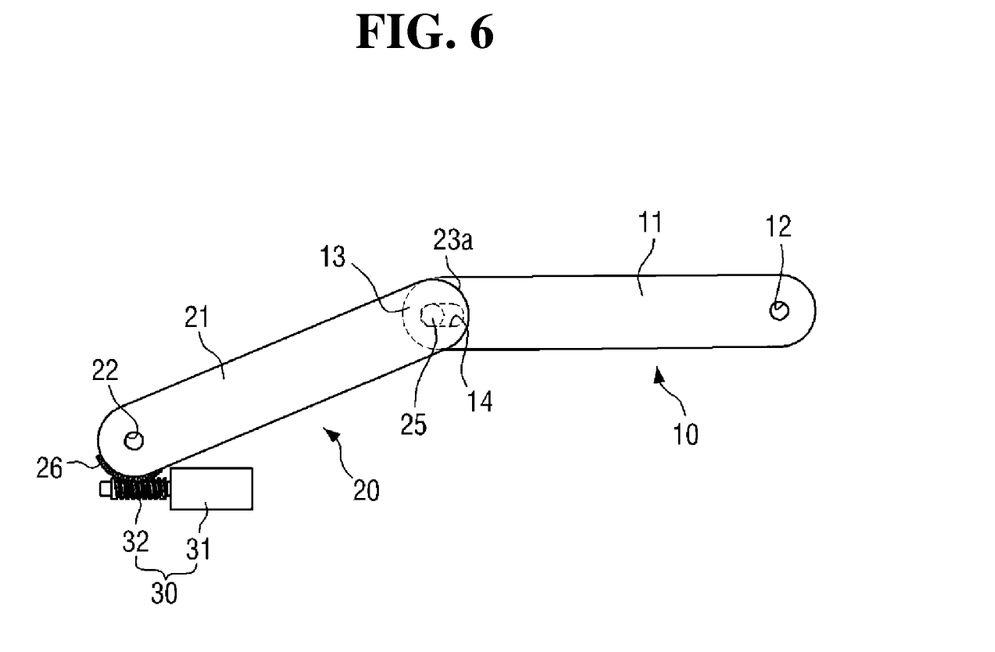
FIG. 6 is an exemplary diagram illustrating the transmission device of FIG. 1 in its welcome state according to an exemplary embodiment of the present invention.

The operation of the transmission device for a vehicle, according to the first exemplary embodiment of the invention, will hereinafter be described. FIG. 5 is an exemplary diagram illustrating the transmission device of FIG. 1 in its standby state, and FIG. 6 is an exemplary diagram illustrating the transmission device of FIG. 1 in its welcome state. Referring to FIG. 5, during the standby state of the transmission device 1, the first rotating unit 10 and the second rotating unit 20 may be substantially in line with each other.

During the standby state of the transmission device 1, the first rotating unit 10, the second rotating unit 20 and the joint unit 40 may be inserted in the console of the vehicle, in which case, the surfaces of the first rotating unit 10 and the second rotating unit 20 where the "R" stage selector 18, the "N" stage selector 19, the "D" stage selector 29, and the "L" stage selector 28 are disposed may be substantially level with the outer surface of the console. The console may include a cover member (not illustrated) configured to cover the surfaces of the first rotating unit 10 and the second rotating unit 20 during the standby state of the transmission device 1. During the standby state of the transmission device 1, the pin 25 in the joint unit 40 may be disposed on one side of the slit 14, as illustrated in FIG. 5.

Referring to FIG. 6, during a welcome state of the transmission device 1, the first rotating unit 10 and the second rotating unit 20 may be maintained to form an obtuse angle therebetween. The transmission device 1 may be switched from the standby state to the welcome state in response to an operating signal being applied to the driving source 31. The operating signal may be set to be applied to the driving source 31 when the engine of the vehicle is driven, a driver is detected from the driver's seat of the vehicle, or the door to the driver's seat of the vehicle is open.

In response to the application of the operating signal to the driving source 31 during the standby state of the transmission device 1, as illustrated in FIG. 5, the driving source 31 may be configured to rotate the worm gear 32 in the first direction to rotate the second rotating unit 20 counterclockwise. In response to the second rotating unit 20 rotating counterclockwise, the first rotating unit 10 may be configured to rotate clockwise. The first rotating unit 10 may be configured to rotate about the first aperture 12, and the second rotating unit 20 may be configured to rotate about the second aperture 22. Since the first aperture 12 may be fixed to the first rotating axis and the second aperture 22 may be fixed to the second rotating axis, the locations of the first aperture 12 and the second aperture 22 may remain fixed.

In response to the second rotating unit 20 rotating counterclockwise and the first rotating unit 10 rotating clockwise, the pin 25 in the joint unit 40 may be moved from one side (e.g., a first side) to the other side (e.g., a second side) of the slit 14. In response to the second rotating unit 20 rotating by a predetermined angle and as a result, the switching of the transmission device 1 to the welcome state being complete, the driving source 31 may be configured to terminate an operation and maintain the welcome state of the transmission device 1. Accordingly, a "driver welcome" function may be output by allowing the transmission device 1 disposed within the console during the standby state, to be ejected from the console during the welcome state. In response to the vehicle being turned off, the driving source 31 may be configured to rotate the worm gear 32 in the second direction to switch the transmission device 1 back to the standby state (e.g., inject the transmission device 1 back into the console).

Figure 7:
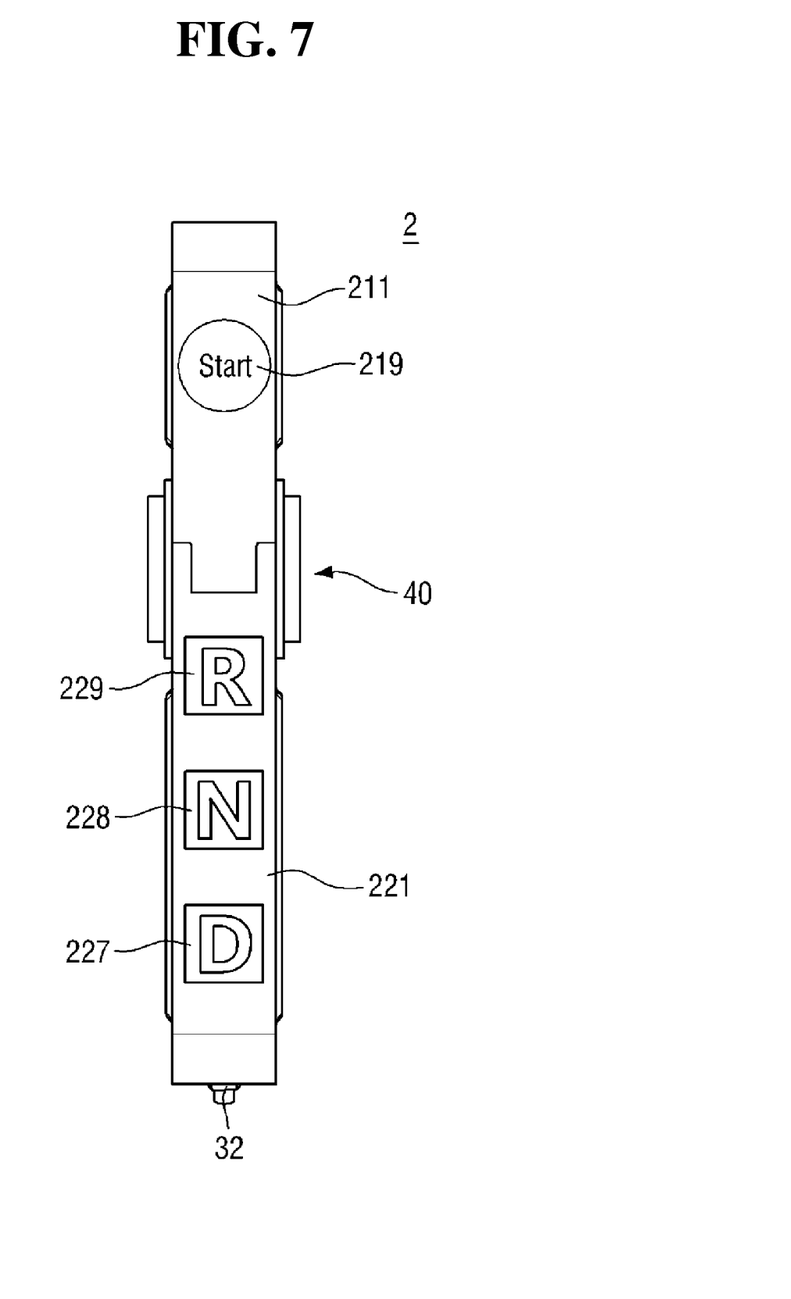
FIG. 7 is an exemplary diagram illustrating a transmission device for a vehicle, according to a second exemplary embodiment of the present invention.

A transmission device for a vehicle, according to a second exemplary embodiment of the invention, will hereinafter be described. For convenience, in FIGS. 1 to 7, like reference numerals indicate like elements, and thus, detailed descriptions thereof will be omitted. FIG. 7 is an exemplary diagram illustrating a transmission device for a vehicle, according to a second exemplary embodiment of the invention.

In the transmission device 1 according to the first exemplary embodiment of the invention, the "R" stage selector 18 and the "N" stage selector 19 of the shift mode selection unit (18, 19, 28, 29, and 42) are disposed on the surface of the first rotating unit 10, and the "D" stage selector 29 and the "L" stage selector 28 of the shift mode selection unit (18, 19, 28, 29, and 42) are disposed on the surface of the second rotating unit 20. Further, in a transmission device 2 for a vehicle, according to a second exemplary embodiment of the invention, a "Start" button 219 for starting the engine of a vehicle may be disposed on the surface of a first rotating unit 211, and a shift mode selection unit may be disposed on the surface of a second rotating unit 221, as illustrated in FIG. 7.

In an exemplary embodiment, an "R" stage selector 229, an "N" stage selector 228 and a "D" stage selector 227 may be disposed on the surface of a second rotating unit 221, but the invention is not limited thereto. In other words, in an alternative exemplary embodiment, an "L" stage selector and a "P" stage selector may be disposed on the surface of the second rotating unit 221. Similarly to the first exemplary embodiment of the invention, the "P" stage selector may be disposed on a joint unit 40. The transmission device 2 may be switched between a standby state and a welcome state in a similar manner to the transmission device 1, and thus, a detailed description of the switching of the transmission device 2 between the standby state and the welcome state will be omitted.

While the invention has been particularly shown and described with reference to exemplary embodiments thereof, it will be understood by those of ordinary skill in the art that various changes in provide and detail may be made therein without departing from the spirit and scope of the invention as defined by the following claims. The exemplary embodiments should be considered in a descriptive sense only and not for purposes of limitation.

What is claimed is:

1. A transmission device for a vehicle disposed within the vehicle and configured to operate a transmission for transmitting the output of the engine of the vehicle to driving wheels, comprising:
   a first rotating unit configured to be rotatably coupled to a first rotating axis;
   a second rotating unit configured to be rotatably coupled to a second rotating axis separated from the first rotating axis;
   a joint unit configured to connect the first rotating unit and the second rotating unit to allow the first rotating unit and the second rotating unit to rotate relative to each other;
   a shift mode selection unit configured to be mounted on at least one of the first rotating unit, the second rotating unit, and the joint unit; and
   a driving unit configured to rotate the second rotating unit about the second rotating axis in response to receiving an operating signal to change an angle between the first rotating unit and the second rotating unit with respect to the joint unit.

2. The transmission device of claim 1, wherein the operating signal is generated when at least one of the conditions is met that: (i) an accessory (ACC) mode of the vehicle is turned on, (ii) the engine of the vehicle is driven, (iii) a driver is detected in driver's seat of the vehicle, and (iv) a door to the driver's seat of the vehicle is open.

3. The transmission device of claim 1, wherein the driving unit is further configured to rotate the second rotating unit about the second rotating axis to form an obtuse angle between the first rotating unit and the second rotating unit.

4. The transmission device of claim 1, wherein the first rotating unit, the second rotating unit and the joint unit are further configured to be ejected from a console of the vehicle, to remain inserted in the console in response to no operating signal being applied, and to be ejected from the console by the driving unit in response to the operating signal being applied.

5. The transmission device of claim 1, wherein the shift mode selection unit includes a reverse "R" stage selector, a neutral "N" stage selector, and a drive "D" stage selector, which are disposed on a surface of the first rotating unit or the second rotating unit.

6. The transmission device of claim 5, wherein the "R" stage selector, the "N" stage selector, and the "D" stage selector are disposed on the surface of the second rotating unit and a start button of the vehicle is disposed on the surface of the first rotating unit.

7. The transmission device of claim 5, wherein the shift mode selection unit includes an "L" stage selector disposed on the surface of the first rotating unit or the second rotating unit.

8. The transmission device of claim 5, wherein the shift mode selection unit includes a park "P" stage selector disposed on a side of the joint unit.

9. The transmission device of claim 5, wherein the shift mode selection unit includes a park "P" stage selector disposed on the surface of the first rotating unit or the second rotating unit.

10. The transmission device of claim 1, wherein the joint unit includes:
    a first arm formed to extend from one of the first rotating unit and the second rotating unit and includes a slit; and
    a second arm formed to extend from one of the first rotating unit and the second rotating unit and includes a pin that slidably moves along the slit.

* * * * *